(12) United States Patent
Esposito

(10) Patent No.: US 9,155,421 B2
(45) Date of Patent: Oct. 13, 2015

(54) ROTISSERIE GRILL

(76) Inventor: Michael Esposito, Farmingville, NY (US)

( * ) Notice: Subject to any disclaimer, the term of this patent is extended or adjusted under 35 U.S.C. 154(b) by 819 days.

(21) Appl. No.: 13/433,522

(22) Filed: Mar. 29, 2012

(65) Prior Publication Data
US 2012/0260809 A1 Oct. 18, 2012

Related U.S. Application Data

(60) Provisional application No. 61/516,279, filed on Mar. 31, 2011.

(51) Int. Cl.
A47J 37/04 (2006.01)
A47J 37/06 (2006.01)
A47J 37/07 (2006.01)

(52) U.S. Cl.
CPC ............ *A47J 37/041* (2013.01); *A47J 37/0688* (2013.01); *A47J 37/0704* (2013.01); *A47J 37/0718* (2013.01); *A47J 37/0745* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,656,181 A * | 1/1928 | Elbert | ......................... | 126/25 A |
| 2,335,217 A * | 11/1943 | Tate | ................................ | 126/14 |
| 2,821,127 A | 1/1958 | Hess | | |
| 2,821,187 A * | 1/1958 | Tescula | ....................... | 126/25 A |
| 2,831,096 A * | 4/1958 | Signore, Jr. | .................... | 219/385 |
| 2,900,482 A * | 8/1959 | Aylor | ............................ | 219/521 |
| 2,923,229 A * | 2/1960 | Halford | ........................... | 99/339 |
| 3,109,420 A | 11/1963 | Ott et al. | | |
| 3,129,653 A * | 4/1964 | Kertesz | ....................... | 99/421 R |
| 3,140,651 A * | 7/1964 | Barnett | ........................... | 99/339 |
| 3,154,005 A | 10/1964 | Roecks et al. | | |
| 3,182,585 A * | 5/1965 | Rensch et al. | ................... | 99/340 |
| 3,208,808 A * | 9/1965 | Knapp | ..................... | 312/249.13 |
| 3,276,351 A * | 10/1966 | Sundholm | ....................... | 99/339 |
| 3,322,061 A * | 5/1967 | Frazier | ....................... | 99/421 M |
| 3,477,360 A * | 11/1969 | Raney | ............................. | 99/339 |
| 3,495,524 A * | 2/1970 | Miles | ............................... | 99/399 |
| 3,581,654 A * | 6/1971 | Tescula | ........................... | 99/399 |
| 3,589,269 A * | 6/1971 | Weir, Sr. | ......................... | 99/332 |
| 3,682,154 A | 8/1972 | Mollere | | |
| 3,742,838 A * | 7/1973 | Luschen et al. | ................. | 99/389 |
| 3,951,052 A * | 4/1976 | Ringo | ............................. | 99/427 |
| 4,036,994 A * | 7/1977 | Ear | ............................... | 426/233 |
| 4,120,237 A * | 10/1978 | Mecherlen | ...................... | 99/340 |

(Continued)

FOREIGN PATENT DOCUMENTS

WO WO 2007149126 A2 * 12/2007

*Primary Examiner* — Dana Ross
*Assistant Examiner* — Renee L Miller
(74) *Attorney, Agent, or Firm* — Thomas A. O'Rourke; Bodner & O'Rourke, LLP

(57) ABSTRACT

An improved grill assembly is provided that has at least three grilling regions for effecting different types of cooking. The first grilling region includes two vertically standing fuel receptacles spaced apart in a grill housing to form an open area therebetween. An opening in the housing allows a food basket to be inserted into the open area to cook both sides of the food at the same time. The second grilling region includes a grilling surface that is placed over a recessed grilling area on the outer surface of the top wall of the grill housing. The third grilling region is a rotisserie cooking region and includes an open area on a side of the grill housing that has a rotatably secured rod that receives a food product and that is in communication with one of the vertical standing fuel receptacles to cook the food product.

20 Claims, 2 Drawing Sheets

(56) References Cited

U.S. PATENT DOCUMENTS

| | | | |
|---|---|---|---|
| 4,211,206 A | 7/1980 | Darbo | |
| 4,325,294 A * | 4/1982 | Hammond | 99/337 |
| 4,362,093 A * | 12/1982 | Griscom | 99/339 |
| 4,442,762 A * | 4/1984 | Beller | 99/427 |
| 4,539,900 A * | 9/1985 | Reed | 99/353 |
| 4,599,938 A * | 7/1986 | Gongwer | 99/446 |
| 4,686,958 A * | 8/1987 | Skelton et al. | 126/369.2 |
| 4,877,011 A * | 10/1989 | Willice | 126/25 R |
| 4,924,844 A * | 5/1990 | Bransburg | 126/9 R |
| 4,947,741 A * | 8/1990 | Gongwer | 99/345 |
| 4,971,045 A | 11/1990 | Probst | |
| 5,001,971 A * | 3/1991 | Beller | 99/421 H |
| 5,163,359 A | 11/1992 | McLane, Sr. | |
| 5,333,540 A * | 8/1994 | Mazzocchi | 99/421 H |
| 5,353,694 A * | 10/1994 | Fins | 99/393 |
| 5,499,574 A * | 3/1996 | Esposito | 99/339 |
| 5,515,774 A * | 5/1996 | Swisher et al. | 99/340 |
| 5,720,217 A * | 2/1998 | Pappas | 99/421 H |
| 5,918,536 A * | 7/1999 | Cheng | 99/447 |
| 6,012,381 A * | 1/2000 | Hawn | 99/340 |
| 6,039,039 A * | 3/2000 | Pina, Jr. | 126/25 R |
| 6,119,586 A * | 9/2000 | Gongwer | 99/345 |
| 6,131,505 A * | 10/2000 | Lin | 99/340 |
| 6,182,560 B1 * | 2/2001 | Andress | 99/400 |
| 6,196,116 B1 * | 3/2001 | O'Grady et al. | 99/340 |
| 6,250,211 B1 * | 6/2001 | Gongwer | 99/340 |
| 6,437,291 B1 * | 8/2002 | Hopponen | 219/395 |
| 6,499,393 B2 * | 12/2002 | Waltman | 99/426 |
| 6,820,538 B2 * | 11/2004 | Roescher | 99/340 |
| 6,883,512 B2 | 4/2005 | Esposito | |
| D535,845 S * | 1/2007 | King | D7/332 |
| 7,159,509 B2 * | 1/2007 | Starkey | 99/339 |
| 2003/0019368 A1* | 1/2003 | Backus et al. | 99/421 H |
| 2004/0182254 A1* | 9/2004 | Gershon | 99/419 |
| 2005/0238341 A1* | 10/2005 | Thaler et al. | 392/441 |
| 2007/0056577 A1* | 3/2007 | Chang | 126/25 R |
| 2007/0283945 A1* | 12/2007 | Gabrielle | 126/25 AA |
| 2008/0245357 A1* | 10/2008 | Meether et al. | 126/25 R |

* cited by examiner ical fuel receptacles contained in the housing discussed
ROTISSERIE GRILL This application claims priority on U.S. Provisional Patent Application Ser. No. 61/516,279 filed Mar. 31, 2011.

FIELD OF THE INVENTION

The present invention is directed to an improved barbeque grill and in particular a barbeque grill that can be used with a rotisserie to cook a variety of different foods several different ways.

BACKGROUND OF THE INVENTION

There are a variety of different devices on the market to assist in grilling food. One type of grill is a gas fueled barbecue grill. Another type is a charcoal fueled grill. In a gas grill, a fuel such as natural gas or propane is used to heat the food. Gas grills are popular because they are convenient and easy to operate and start. Many people, however, prefer food cooked on a charcoal grill. Also, a grill that uses a different type of wood or charcoal can impart different flavors to the food that are desirable to many grilling enthusiasts. For example, some grillers use mesquite or fruit wood such as apple or cherry woods in their grilling activities. They claim that charcoal grilling with these woods imparts a desirable flavor to the foods, particularly meats, that is not achieved with a gas grill.

Two examples of charcoal grills are shown in my U.S. Pat. No. 6,883,512 for a Portable Grilling Apparatus and my U.S. Pat. No. 5,499,574 for a Vertically Oriented Dual Grill. In my prior patents, the barbeque grills disclosed therein offer an improved device for cooking foods quickly and with reduced flare ups from drippings from the food hitting the fire.

OBJECTS OF THE INVENTION

It is an object of the invention to provide an improved grilling apparatus.

It is also an object of the invention to provide an improved barbeque grill using charcoal or other similar type of solid fuel.

It is still another object of the invention to provide a barbeque grill that has a rotisserie function for cooking food products.

It is still a further object of the invention to provide a rotisserie style of roasting where there is a reduced risk that fat from the food will flare up and ignite.

SUMMARY OF THE INVENTION

The present invention is directed to an improved barbeque grill that uses solid fuel to cook the food. The grill of the invention employs a variety of grilling regions to effect different types of cooking. One grilling area has a pair of vertically standing fuel receptacles that are spaced apart in a main housing area to form an open area. A grilling basket that contains the food to be cooked is positioned between the fuel receptacles so that both sides of the food can be cooked at the same time. This speeds up the cooking process and reduces the risk of one portion of the food being under cooked compared to other parts of the food. The housing may also include a tray in a bottom portion of the housing. The tray is preferably slidable from a first position to a second position. One of the positions is where the tray is within the housing and droppings from the food fall into the tray. The second position is where the tray is removed from the housing for cleaning or for other reasons. The removable tray may be provided with an amount of water in the tray that covers the bottom of the tray. The water prevents flare ups of the fat or grease as the fat or drippings drips off the food being cooked. The water quenches the droppings and prevents them from being ignited by the heat source.

In addition to the first grilling area between the two vertical receptacles, the grill has a second grilling area generally on the top surface of the housing. This second area provides the grill with additional cooking capacity. The second grilling area may have a recessed area for receiving a quantity of a solid fuel such as wood, wood chips, charcoal or coal etc. This grilling area may be directly above the openings for the two vertical fuel receptacles contained in the housing discussed above. There is a removable grilling surface that can be positioned over the coals so that additional food products can be cooked. This grilling surface may be hingedly connected to the housing. The grilling surface can be generally rectangular and have a metal mesh for supporting the food to be cooked. Preferably the grill is made from a stainless steel or other material that will not corrode from the heat or moisture.

The housing may also be provided with a third grilling region. This region preferably extends from end of the housing and utilizes the heat from one of the vertical grilling receptacles. This third region has an open area for receiving a food to be cooked. The sidewalls of the housing may be provided with a means for receiving a shaft or rod that is adapted to rotate as the food is cooked. The food to be cooked is placed on the shaft or spit by for example spearing the rod through the food. The shaft is preferably rotated while food is present. This rotation continuously presents to the heating surface a different portion of the food product so that the rotation of the shaft permits a uniform grilling of the food products. Since the food product continually rotates when a motor means is initiated there is less risk of burning one or more portions of the food products. As the motor rotates, the shaft causes the food to rotate along with the shaft. Since the coals are adjacent to only a portion of the food as it rotates the motion of the shaft provides for uniform cooking.

A hood or other cover may be positioned over the third grilling region. This cover is preferably removable to provide access to the food. The cover can be completely removed or it can be hingedly connected to the housing on one side thereof. The cover can be positioned in a closed arrangement when the food is cooking to keep the heat in. Alternatively the cover may be opened so that the user can view the progress of the food. The motor permits the spit to rotate about an axis as the cover is opened. A handle means can be present to permit a user to grasp the hood to raise and lower as needed. A material that does not transfer heat but which has a high melting or charring temperature is preferably used as the handle means so that there is no injury to the user when operating the hood.

BRIEF DESCRIPTION OF THE INVENTION

DETAILED DESCRIPTION OF THE INVENTION

Figure 1:
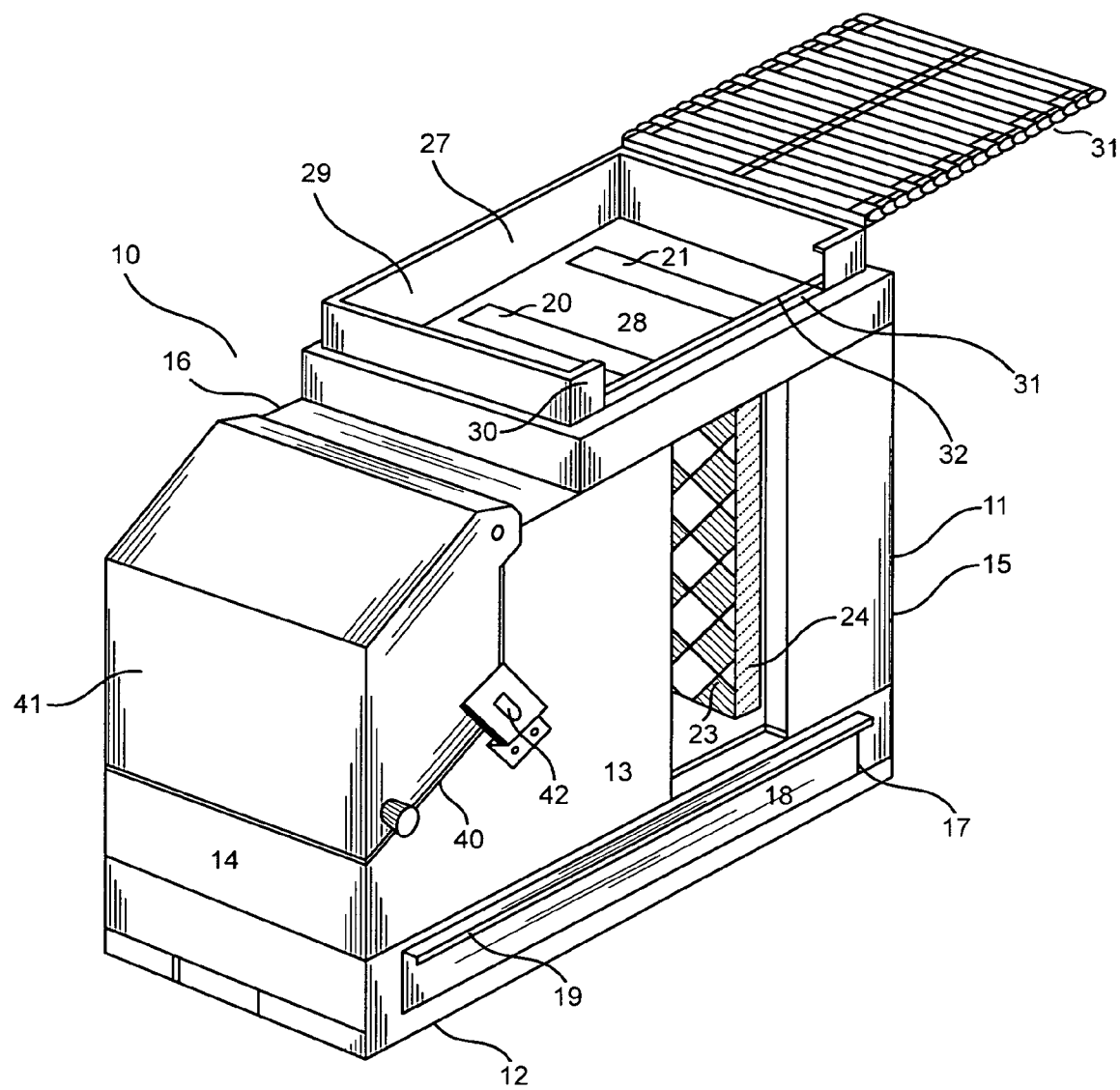
FIG. 1 is a perspective view of one embodiment of the grill of the present invention.

FIG. 1 shows a representative example of the grill 10 of the present invention. The grill of the present invention is preferably one that uses a solid fuel as opposed to a liquid or gas. This fuel can be any of the solid fuels that are typically used in grilling including but not limited to charcoal, briquets, wood, wood chips etc. The grill preferably has at least three grilling areas that can be used to grill foods. These grilling areas can be used together or separately. The three grilling surfaces are useful if there are a number of people that have to be fed but also the three surfaces have a particular applicability for cooking different food products so that tastes and flavors are not mingled together.

The grill 10 includes a housing 11. The housing is preferably made of a solid sheet metal. Although a particular shape of the housing is shown in the Figures, it will be appreciated that the housing may be any suitable shape and size. As shown in FIG. 1, the housing has an overall rectangular configuration with a plurality of grilling areas. The housing may be a unitary structure or it may be separate members secured together by a suitable means. The housing may have a bottom surface 12 which can rest on a table or other suitable heat resistant surface. Alternatively, there may be one or more legs extending from the grill to support the housing. Extending upwardly from the bottom surface of the grill may be one or more sidewalls 13. In this embodiment there are four sidewalls, however other configurations are possible. The sidewalls of the grill may include a front wall 13 and two sides 14 and 15 extending from the opposite edges of the front sidewall 13. The two sides 14 and 15 are joined together by a rear sidewall 16 that extends from one end wall 14 to the other 15. The sides 14 and 15 can be identical in configuration or one side 14 may be smaller as shown in FIG. 1. The configuration shown in FIG. 1 is generally rectangular in vertical cross-sections and portions thereof are generally rectangular in horizontal cross-section.

The housing may include an orifice 17 in a side of the housing for receiving a tray 18. The tray may have a bottom surface and one or more sidewalls extending upwardly from said bottom surface. The front wall may be provided with a handle 19 to enable a user to pull the tray in and out of the housing. Sliders may also be used to facilitate movement of the tray. The sliders may be secured to the interior of the housing and to the tray. The tray is usually filled with water to catch any dripping from the food cooking in the grill. The tray of water prevents the drippings from igniting as they build up in the grill. The water also makes clean up easier as the fat drippings do not get baked on the surface of the tray. Instead of water, sand or other non-combustible materials could be used to prevent flare ups.

The grill may have a first vertical receptacle 20 and a second vertical receptacle 21 for receiving a solid fuel such as charcoal. The receptacles may be generally rectangular and have a first wall which is preferably made of a sheet material. The sheet material is preferably metal and can be either solid or contain one or more orifices for heat to escape. The first wall 23 of one of the receptacles may be part of the outer wall of the housing or a separate wall surface. There is also an opposite side wall 23A which may be a grill or screen that holds the coals but permits the heat to pass through readily. There is also a front end wall 24 and a rear end wall. The end walls, like the side walls, may be a sheet metal or may be a grill or screening to permit the heat from easily passing toward the fuel.

Figure 2:
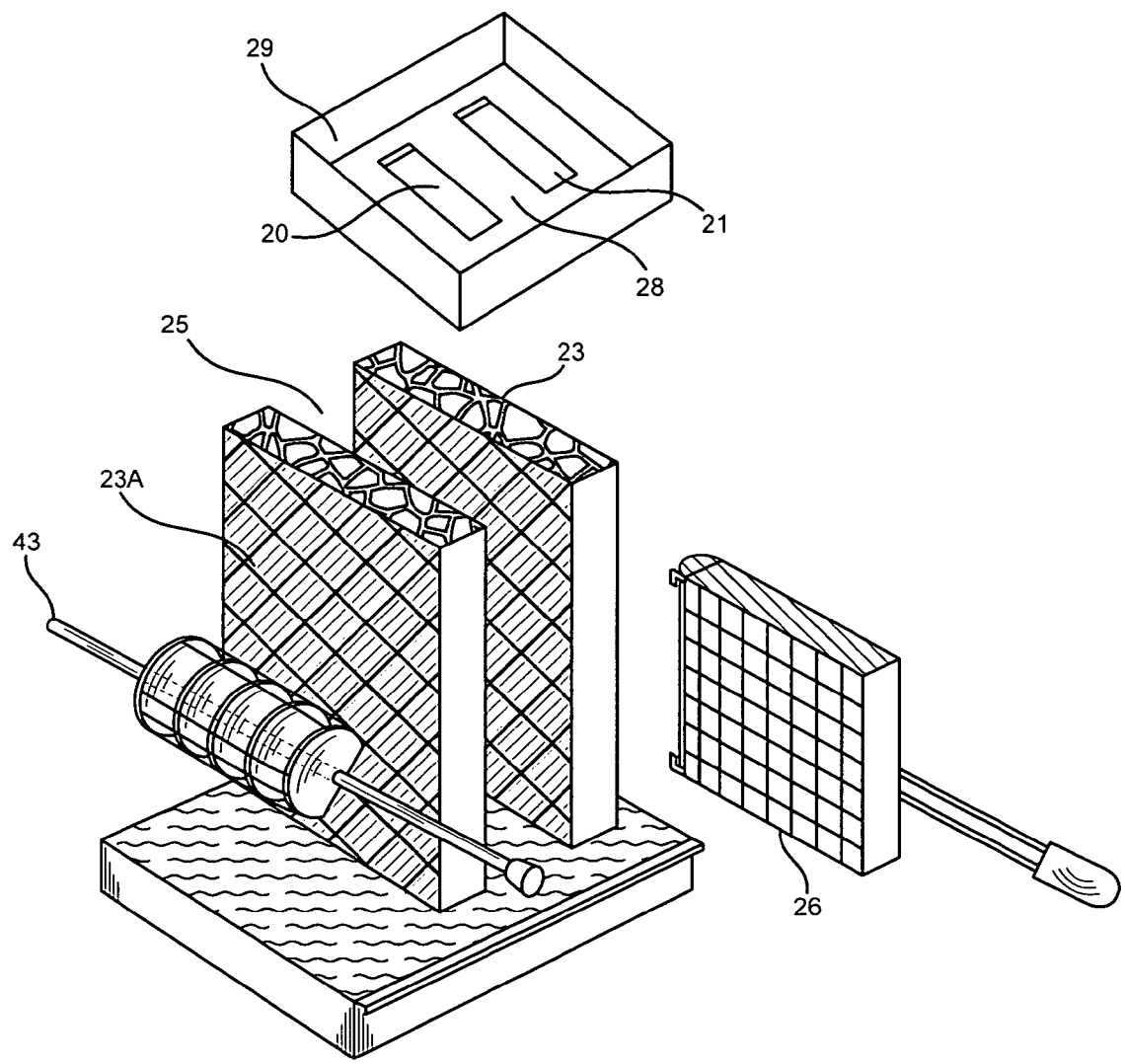
FIG. 2 is a view of the interior layout of the grill of FIG. 1 with the housing removed.

The two receptacles are separated by an open area 25 which permits the food to be inserted as seen in FIG. 2. A typical means for holding the food is a food basket 26 which is similar to a fish basket that is used to cook fish on a grill. The basket has a first side that has a mesh surface for permitting the heat to pass through. There are one or more, usually four, sidewalls extending from the first side that form a recessed area for receiving the food to be grilled. There is a cover which may also be a mesh material. The cover can be hinged or otherwise removable for holding the food in place. There is also a handle on one side of the basket for carrying and inserting the basket between the two coal receptacles 20 and 21 in the grill. In addition, one or more of the surfaces of the food basket may be a grill screen or other metal screening that allows heat to be transferred to the food that is in the food basket.

The top surface of the grill may be provided with a second grilling region that can include a recessed area for receiving additional fuel such as charcoal. The recess may have the top surface of the grill housing as the bottom or base 28. There can be one or more sidewalls 29 extending upwardly from the base. One sidewall 30 may be partially open, if desired. Over the recessed area, a grilling surface 31 may be placed. The grilling surface may be a separate item or part of the housing. In one embodiment, the grilling surface may be hingedly attached to the housing. As seen in FIG. 1 the grilling surface may be raised so that charcoal or other fuel can be added to the recessed area. This grilling area provides another cooking surface for the grill. In this instance the food product is placed on the surface of the grill.

On one side of the recessed area there may be an open sidewall 31. This region can be an entire side of the recessed area or a portion of it. A bar or rod 32 may extend across the open area. This open area permits coal to be added to the recessed area if needed without lifting the grill.

Extending from one end of the housing is the rotisserie area 40 of the grill. The rotisserie area has a hood 41 that extends over the area. This hood may be removable or it may be rotatably secured to the housing by, for example one or more hinges. The hood preferably has a top surface, a front sidewall and a rear sidewall. There may also be an end wall as well. The top surface can be angled so that it is lower at one end than the other. If the top surface is angled it is preferable that the end furthest from the fire be lower than the end closer to the fire. This angled surface permits any grease or water vapor that rises from the cooking food to drip off the inner surface of the hood into the catch pan below. The front and rear sidewalls of the body may be provided with a recess portion 42 for receiving a rod or shaft 43 that extends generally from one sidewall to the other sidewall. A motor may be provided if desirable for rotating the shaft. This motor causes the food on the shaft to rotate. As the food is rotated the portion of the food closest to the coals can be cooked. As the shaft rotates a more uniform cooking of food can take place since only a portion of the food is being heated as the shaft rotates.

As seen in FIG. 1, the recess in the sidewall can have a guard or guide secured to the sidewall so that the area of the sidewall is reinforced. The guard or guide may be a sheet material with an upper surface that has an open area for receiving the shaft of the rotisserie. The recessed area may be on both sides of the housing. On the front sidewall there may also be a handle means that permits the user to lift the covering so that the user has access to the interior. The recess 20 that receives coal may be provided with an open mesh grill surface on both sides to permit heat to reach the food rotating on the shaft rotating under the hood. When the user is desirous of using the rotisserie feature of the present invention, the food to be cooked is skewered by the shaft or a spit. The benefits of using the rotisserie feature is that the food, usually meat, is cooked evenly in its own juices. The rotisserie feature with the hood also permits continuous basting of the meat if desired. The rotisserie of the present invention is a horizontal style rotisserie where the spit is mounted horizontally. This has particular application for roasting chickens or roasts of various other meats including but not limited to beef and pork. Various attachments can be used to secure the meat to the spit.

The motor drive, if desired, turns the spit at a constant selected speed. The speed can preferably vary depending on the type of food to be cooked and the proximity of the food to the coals. The user should place the food on the spit so that it is fairly balanced. An unbalanced placement of the food could cause the motor to become overloaded. Also, for some food products such as chicken, the wings and legs could interfere with rotation of the spit.

FIG. 2 shows a representation of the interior of a main part of the grill. The Figure shows the tray or receptacle having a quantity of water present to prevent flare ups. The Figure also shows the receptacles 20 and 21. The receptacles 20 and 21 have a generally rectangular configuration with a first face and a second face and two end walls. The faces are preferably open to permit air to access the fuel in the receptacles. A metal mesh would be an example of a suitable material for the face walls of the receptacles. The receptacles are preferably open at their top to permit fuel to be added. The receptacles are preferably removable to facilitate removal of ash from previously burned fuel. The grill basket is preferably positioned between the two receptacles. This permits food to cook on both sides at the same time.

What is claimed is:

1. An improved grill assembly that has at least three grilling regions to effect different types of cooking, comprising:
    a housing that has a bottom wall, one or more sidewalls extending from said bottom wall, and a top wall connected to the opposite end of said one or more sidewalls, said housing further including an opening in said one or more sidewalls for receiving a food basket to be inserted therein;
    a first grilling region that includes at least a pair of vertically standing fuel receptacles that are spaced apart in said housing to form an open area that receives the food basket, wherein the food basket contains food to be cooked and wherein the food basket is positioned in said open area between said fuel receptacles to cook more than one side of the food product simultaneously, said fuel receptacles each adapted to receive a quantity of fuel for cooking the food product;
    a second grilling region above said top wall of said housing, wherein said second grilling region comprises a recessed area above said top wall of said housing for receiving an additional quantity of solid fuel thereon, said recessed area formed by said one or more sidewalls extending beyond said top wall of said housing, said second grilling region further comprising a grill member positioned above said recessed area; and
    a third grilling region that includes an open area on a side of said housing for receiving food to be cooked wherein said open area is in communication with at least one of said pair of vertically standing fuel receptacles to cook said food, said third grilling region further comprising a rod that is rotatably secured to one or more sidewalls of said housing, said rod having at least a portion of its length extending through said open area, said rod adapted to receive said food to be cooked, and said rod adapted to rotate as the food is cooked to permit a uniform grilling of the food.

2. The grill assembly according to claim 1 further comprising a tray received upon said bottom wall, and configured to underlie each of said three grilling regions, and to receive and have distributed thereon, a quantity of material configured to prevent flare ups.

3. The grill assembly according to claim 1 wherein said pair of fuel receptacles extends downwards from the inside surface of said top wall of said housing and wherein each of said pair of fuel receptacles is in communication with an opening along said top wall of said housing for receiving a quantity of fuel.

4. The grill assembly according to claim 3 wherein each of said fuel receptacles comprises: a first wall; a second wall oppositely situated from said first wall; a front end wall connected to a first side edge of said first wall at a first side edge of said front end wall and connected to a first side edge of said second wall at a second side edge of said front end wall; a rear end wall oppositely situated from said front end wall and connected to a second side edge of said first wall at a first side edge of said rear end wall and connected to a second side edge of said second wall at a second side edge of said rear end wall; and a bottom wall that is connected to a bottom edge of said first wall, said second wall, said front end wall and said rear end wall, top wall.

5. The grill assembly according to claim 4 wherein said fuel receptacles are removably attached to said housing to facilitate removal of ash from previously burned fuel.

6. The grill assembly according to claim 5 wherein said fuel receptacles are made of a metal mesh that holds the quantity of fuel and that allows heat to escape the receptacles to cook the food product.

7. The grill assembly according to claim 1 wherein at least one of said sidewalls extending upwards beyond said top wall has at least a portion that is open for allowing solid fuel to be added to said recessed area and wherein said open area has a rod extending across its length for supporting said grilling surface over said recessed area.

8. The grill assembly according to claim 1 further comprising a hood, wherein said hood has a top wall, a front sidewall extending from one edge of said top wall and a rear sidewall extending from a second edge of said top wall, said hood being rotatably secured to one or more sidewalls of said housing and a handle being connected to one or more of said hood's walls for opening and closing said hood.

9. The grill assembly according to claim 8 wherein said rod of said third grilling region is situated horizontally across said housing and is in communication with said second wall of one of said fuel receptacles to cook the food product on said rod.

10. The grill assembly according to claim 9 wherein said top wall of said hood is angled so that said top wall is lower at one end than a second end and wherein said lower end is the furthest end from said second wall of one of said fuel receptacles.

11. The grill assembly according to claim 10 wherein said angled top wall of said hood permits any grease or water vapor that rises from the food being cooked to drip off an inner surface of said hood into said tray for catching drippings.

12. The grill assembly according to claim 9 wherein a motor rotates said rod.

13. The grill assembly according to claim 1 wherein said third grilling region further comprises a hood that is secured to at least one or more of said housing's sidewalls and that extends over said third grilling region open area.

14. The grill assembly according to claim 2 wherein said tray is slidably adjusted from said first position to said second position, wherein said tray comprises a bottom surface and one or more sidewalls extending upwards from said bottom surface to define an area for receiving said food drippings and to receive an amount of a non-combustible material to prevent flare ups, and wherein said tray has at least one handle on at least one of said sidewalls for adjusting said tray from a first position to a second position.

15. A grill assembly comprising:

a housing comprising: a bottom wall; one or more sidewalls extending upwardly from said bottom wall; and a top wall connected to at least a portion of said one or more sidewalls proximate to, but below an upper end of said one or more sidewalls, to form an upper recess; said one or more sidewalls comprising a vertically oriented opening therein, and a second opening; said top wall comprising a first opening and a second opening;

a first vertically oriented fuel receptacle configured to extend down from said top wall, and to be open at said top wall at said first opening therein, to receive fuel in said first receptacle;

a second vertically oriented fuel receptacle configured to extend down from said top wall, and to be open at said top wall at said second opening therein, said second fuel receptacle configured to extend down from said top wall to be spaced a distance away from said first receptacle to form a first grilling region therebetween; said vertically oriented opening in said housing having a lateral extent configured to expose at least a portion of said spaced distance between said first and second receptacles, and having a vertical extent substantially coextensive with a height of said fuel receptacles, said vertically oriented opening configured to receive a food basket therethrough, to be supported by said housing in said first grilling region;

a grill member received at said upper end of said one or more side walls, being above said recess and substantially parallel to said top wall, to form a second grilling region; said recess configured to retain additional fuel distributed upon said top wall;

a hood pivotally attached to said housing to be movable between a first position, wherein said hood covers said second opening in said one or more side walls, to form a third grilling region, and a second position, wherein said hood is pivoted to expose said second opening in said one or more side walls; said second opening in said one or more side walls positioned on a side of said first vertically oriented receptacle being opposite said spaced distance between said first and second receptacles;

a rod rotatably received by said one or more sidewalls, for at least a portion of said rod to be at a second distance away from said first receptacle, in said third grilling region; and a tray received upon said bottom wall, and configured to underlie each of said three grilling regions, and to receive and have distributed thereon, a quantity of material configured to prevent flare ups.

16. The grill assembly according to claim 15, wherein said first and second fuel receptacles are formed of a mesh material.

17. The grill assembly according to claim 16 comprising a motor configured to drive said rod to rotate.

18. A grill assembly comprising:

a housing comprising: a bottom wall; one or more sidewalls; and a top wall connected to said one or more sidewalls; said one or more sidewalls comprising a vertically oriented opening therein, and a second opening; said top wall comprising a first opening and a second opening;

a first vertical fuel receptacle interconnected with said first opening in said top wall;

a second vertical fuel receptacle interconnected with said second opening in said top wall, said second fuel receptacle spaced a distance away from said first receptacle to form a first grilling region therebetween, said vertically oriented opening in said housing having a lateral extent configured to expose at least a portion of said spaced distance between said first and second receptacles, and having a vertical extent substantially coextensive with a height of said fuel receptacles, said housing configured to support a food basket in said first grilling region, received through said vertically oriented opening;

a grill member received above said recess by said upper end of said one or more side walls, to form a second grilling region;

a hood pivotally attached to said housing to be movable between a first position that covers said second opening of said one or more sidewalls, and at least a second position; said second opening in said one or more sidewalls positioned adjacent to a side of said first vertical receptacle being opposite said spaced distance between said first and second receptacles, to form a third grilling region;

a rod rotatably secured to said one or more sidewalls at a second distance away from said first receptacle, to have a portion extend through said third grilling region; and a tray received upon said bottom wall, and configured to underlie each of said three grilling regions, and to receive and have distributed thereon, a quantity of material configured to prevent flare ups.

19. The grill assembly according to claim 18, wherein said first and second receptacles each comprise a generally rectangular shape, and are formed of a mesh material.

20. The grill assembly according to claim 18, wherein said grill member received by said one or more side wall comprises being pivotally attached to said one or more side walls to be moveable between a first position, being above said recess and at said substantially parallel orientation with respect to said top wall, and at least a second position, being at an angle with respect to said top wall.

* * * * *